Nov. 3, 1959 T. A. RISCH 2,910,730
FILLING ELONGATED CAVITIES WITH POLYURETHANE FOAMS
Filed July 5, 1956 2 Sheets-Sheet 1
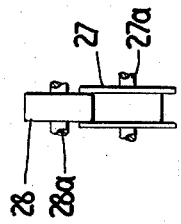
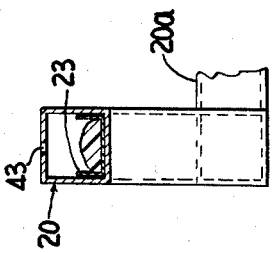
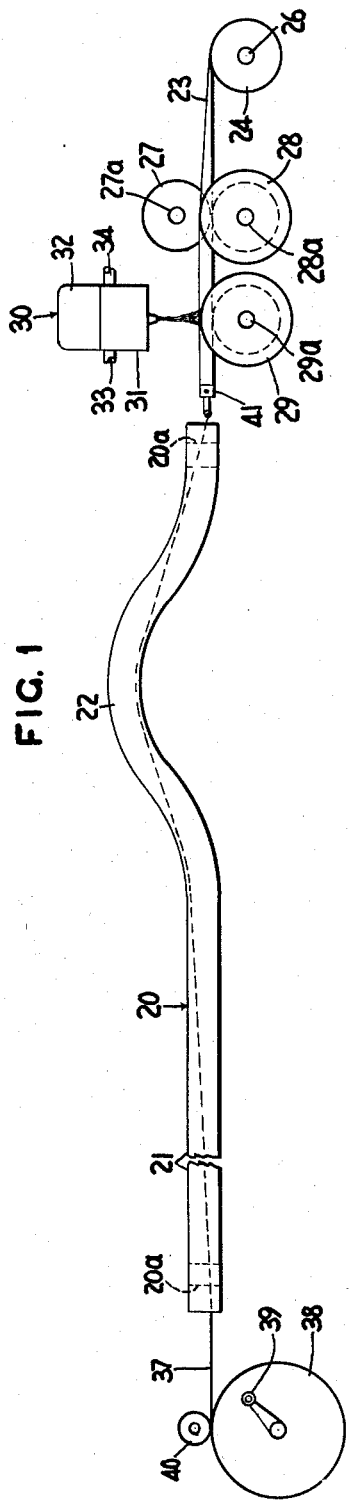
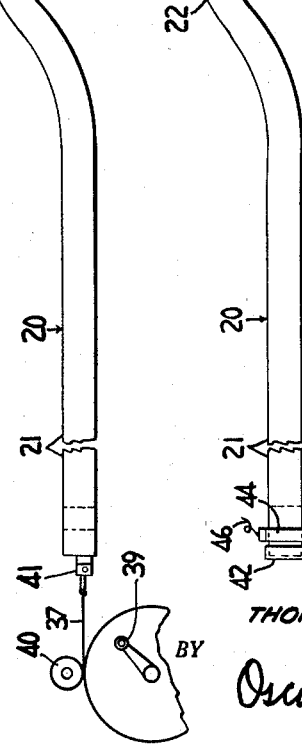
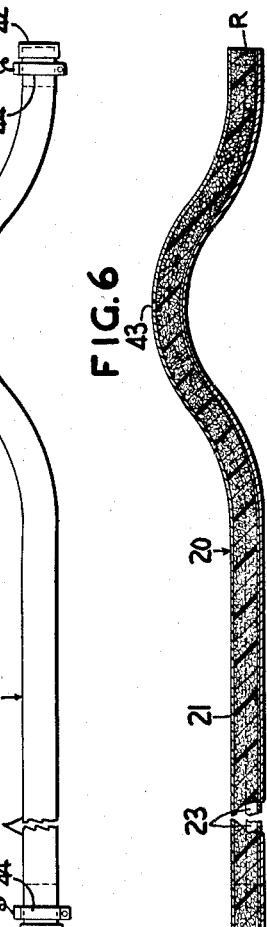
INVENTOR.
THOMAS A. RISCH
BY Oscar L Spencer
ATTORNEY Nov. 3, 1959 T. A. RISCH 2,910,730
FILLING ELONGATED CAVITIES WITH POLYURETHANE FOAMS
Filed July 5, 1956 2 Sheets-Sheet 2

INVENTOR.
THOMAS A RISCH
BY
Oscar L Spencer
ATTORNEY

United States Patent Office 2,910,730
Patented Nov. 3, 1959

2,910,730

FILLING ELONGATED CAVITIES WITH POLYURETHANE FOAMS

Thomas A. Risch, New Kensington, Pa., assignor to Pittsburgh Plate Glass Company, Allegheny County, Pa., a corporation of Pennsylvania Application July 5, 1956, Serial No. 595,879

4 Claims. (Cl. 18—59)

This invention relates to a method of filling cavities in solid bodies with foams of polyurethane resins and it has particular relation to a method of filling the bores of relatively elongated tubular bodies with such foams.

It has heretofore been recognized that very light weight, highly cellulated foams of polyurethane resins may be prepared by mixing and reacting (A) a compound containing two or more hydroxyls (B) a liquid compound containing two or more isocyanate groups and (C) water or a water producing substance.

Various features of such process have heretofore been elaborated upon in prior literature, such as an article by Bayer et al., "Journal of Rubber Chemistry and Technology," volume 23, pages 812 to 835 inclusive, and again in an article by A. T. Stevenson, "Rubber Age," volume 77, Number 1, pages 63 to 68, and many others. Various improvements of technique of preparing such foams are also illustrated in such copending patent applications (which are commonly owned with this application) as Serial Number 538,875, filed October 3, 1955, Earl E. Parker; Serial Number 521,414, filed July 11, 1955, Earl E. Parker and Keith H. Coultrap; Serial Number 517,094, filed June 21, 1955, Earl E. Parker and Keith H. Coultrap; and Serial Number 522,928, filed July 19, 1955, Joseph J. Reis, Jr., now Patent No. 2,779,689.

It is a characteristic of the reaction between a compound containing a plurality of hydroxyls and a compound containing a plurality of isocyanate groups that several methods of mixing the components are permissible; but all are characterized by the fact that the water and the compound containing isocyanate groups are maintained separate until just before foaming and interpolymerization are to be effected. So long as the water is kept from the isocyanate, the several components of the mixture, separately or in contact with each other, are fairly stable. Thus, a substantially anhydrous hydroxyl containing compound and an isocyanate containing compound may be mixed and allowed to react to provide a liquid prepolymer which is relatively stable and does not foam substantially so long as it is maintained free of water. When it is desired to effect the final foaming and curing of the prepolymer, the water may then be incorporated as a separate component.

It is also permissible to incorporate the water with the hydroxyl-containing component to provide a separate package which is subsequently incorporated with the isocyanate component which has also been kept as a separate package. The resultant emulsion of the two packages will result in very rapid foaming and curing of the mixture.

Still another convenient procedure involves incorporation of the entire amount of the component containing isocyanate groups required for forming the foam, with a portion only of the hydroxyl-containing component, but without the inclusion of water. Water may then be incorporated into the remaining portion of the hydroxyl-containing component and this component as a separate package may be incorporated with the prepolymer of the isocyanate component and the hydroxyl-containing component.

The mixing of all of the components simultaneously just at the time the final product is to be prepared is also within the scope of the invention.

It is a characteristic of the foregoing techniques of providing foamable mixtures that within a matter of minutes or even seconds after the complete system of components is brought together, and the water and the compound containing isocyanate groups are brought into contact, a reaction to liberate gases and to cause gelation of the emulsion mixture begins and proceeds quite rapidly substantially to completion even at room temperature. If heat is applied, the reaction is accelerated.

The foams, when properly prepared, are extremely highly cellulated and therefore are of very light weight. They are well adapted for use as insulating media against the conduction of heat, sound, vibration and the like. For these reasons, the use of the foams for filling cavities in hollow bodies suggests itself. For example, the foams would appear to be exceptionally good packing for such hollow members as certain types of frames of vehicles, aircraft, buildings and many other constructions, in order to increase the strength thereof. They also effectively reduce heat conduction, sound conduction, vibration transmission, and other phenomena. However, difficulty has been experienced in properly filling many hollow bodies with foam owing to the extreme reactivity and other characteristics of the foamable mixtures, which prevent proper expansion of the foam to fill all portions of the cavities before an unduly advanced state of cure with resultant immobilization of the mass is attained. Thus, to fill a long tube or tunnel with the foam, it might be natural to stand the member to be filled with the cavity in vertical, or nearly vertical position and then to pour in the proper amount of foamable liquid mixture through an appropriate opening into the cavity. It might be expected that the mixture, if employed in adequate amount would then foam up completely to fill the cavity. However, in actual practice, much difficulty has been experienced in such techniques. It has now been found that apparently this difficulty arises at least to a substantial degree from the fact that the liquid mixture initially occupies only a small part of the space. It also starts to gel very quickly and therefore the liquid layer in the bottom of a cavity will tend to set or gel before foaming is complete, thus providing a plug which tends to restrict further expansion of the mass to fill the cavity. The pressures generated within the mass below the surface may be so great as to produce disruption of the cells and this action is accentuated by tendency of the liquid mass to be pushed up, thus dragging the peripheral portions of the partially foamed mass along the solid surfaces constituting the inner walls of the cavity and breaking many cells. In any event, the cavities were not adequately filled with foam at any appreciable distance from the point at which the liquid layer was initially collected within the cavity. For example, assuming that the body to be filled was a tube or pipe, such as might be employed in certain types of automobile frames, it was found that the introduction of liquid foamable mixture at one end of the frame, as for example by standing the latter on end and pouring in the mixture at the other, resulted in filling of the tubular parts for only a short distance above the lower end. The foam in the zone actually filled was also extremely heavy and not adequately cellulated. If the passages to be filled were also bent or distorted the difficulty was even greater.

In accordance with the provisions of the present invention, it has now been found that elongated cavities in hollow bodies may be successfully filled with foamed polyurethane resins along the cavity to be filled by charging foamable, liquid mixture along the length of the cavity, preferably while the cavity is horizontal, or as nearly so as practicable. When the mixture foams up, the path of expansion before the mass bridges across the opposite wall is relatively short and there is but little dragging of the partially set mass across solid surfaces. As a result, filling of the cavity is adequate and the foam is sound and uniform.

As a still further feature, the invention comprises the laying of the foamable mixture upon a strip or sheet of flexible material, such as paper, cloth, metal foil or the like, and then inserting the flexible member with the foamable mixture thereupon into the cavity to be filled. The mixture can then foam up vertically to fill the cavity and to press the flexible member against the contiguous portion of the wall of the cavity without the foam having to travel any substantial distance.

For a better understanding of the invention, reference may now be had to the accompanying drawings in which like numerals refer to like parts throughout and in which:

Fig. 1 is a diagrammatical view illustrating one phase in the filling of a tubular member, such as a tubular longitudinal element of the frame of an automobile with a foam of polyurethane resin;

Fig. 2 is a diagrammatical view illustrating rollers employed in shaping a strip of flexible material designed to carry the foamable mixture into the tubular member;

Fig. 3 is a diagrammatical view illustrating a second phase in the filling of the tubular member;

Fig. 4 is a view of the tubular member taken substantially upon the line IV—IV of Fig. 3;

Fig. 5 illustrates a still further phase in the filling of the tubular member with foam;

Fig. 6 is a sectional view illustrating the tubular member after it has been filled;

Figure 8:
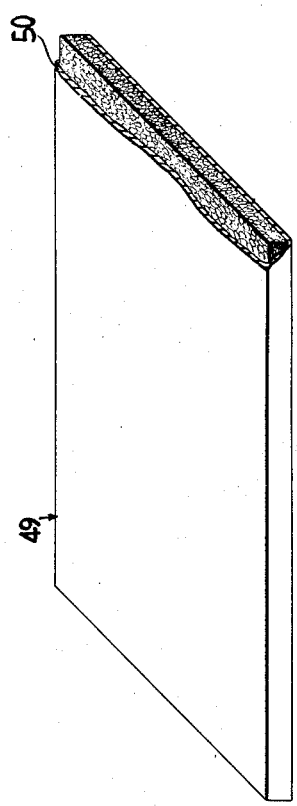
Fig. 8 illustrates a panel-like element comprising an outer covering of sheet material such as sheet steel and an inner packing or filling of foamed polyurethane resin.
Figure 9:
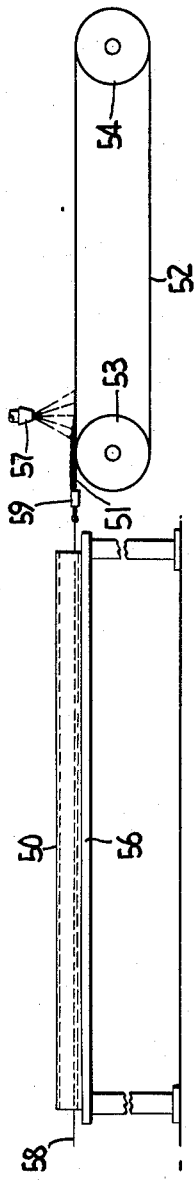
Figure 10:
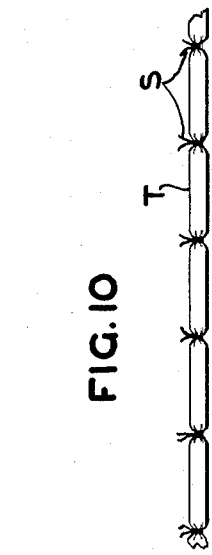

Fig. 9 diagrammatically illustrates a method of and apparatus for forming the element of Fig. 8; and Fig. 10 is a tubular carrier for foamable mixtures showing ties dividing the member into sections.

In the embodiment of the invention as shown in Fig. 1, a tubular member, such as a longitudinal element of rectangular section for an automobile frame is indicated as 20. It comprises a straight portion 21 and an upwardly bowed portion 22, such as might be provided in order to obtain clearance for the rear axle housing of an automobile. Two such elements in spaced relation may be connected together by cross bars 20a, welded or otherwise secured in position, thus forming a frame for an automobile.

For purposes of introducing foamable material throughout the length of the tubular element, a strip 23 of flexible material such as a tape of paper or fabric designed to be bent to a trough-like cross section, may be provided with a layer of foamable material externally of the tubular element. In the drawings, a supply of the strip is shown as being wound up into a roll 24 upon a rotatable shaft 26. The strip may be formed of porous paper through which the liquid mixture of foamable material is adapted to permeate in order to effect adhesion to the metal upon which the paper layer rests. However, if adhesion is not necessary, the strip may be impermeable. In order to impart increased elongation and flexibility to the paper, the latter may, if desired, be creped or, if preferred, accordion pleated. However, the latter features are not essentials of the invention and may well be dispensed with especially in event that the tubular member to be filled with foam is straight or is not sharply bent.

In order to impart a trough-like cross section to the strip, the latter may be drawn between a pair of coacting rollers 27 and 28 upon shafts 27a and 28a, the lower one (28a) of which is appropriately grooved to provide a channel in which the paper strip is received. If preferred, the channel could also be of rounded section. The upper roller (27) is also contoured to fit within the groove of the lower roller and thus to force the strip into said groove. The paper strip having a trough-like section imparted thereto by rollers 27 and 28 may be further passed over a second grooved roller, indicated at 29 and being disposed upon shaft 29a and being adapted to support the projecting portion of the strip as it is charged with foamable mixture.

A foamable mixture of a compound containing a plurality of hydroxyls and a compound containing a plurality of isocyanate groups is deposited in the channel formed by the strip by means of an appropriate mixer apparatus 30 which may be of continuous type and comprises a turbo-mixer 31 which is driven by a motor 32. One component or package of the foamable mixture containing isocyanate groups is supplied to the mixing apparatus as through a hose connection indicated at 33, while the other component containing water, or a water supplying agent, is added through a similar connection as at 34. The mixture is discharged from the mixer through a nozzle 36 which is disposed directly above the roller 29 so that the foamable mixture is received in the channel formed by the paper.

It will be apparent that the paper, if of sufficient rigidity, may be pushed through the tubular member 20 as from the rear. However, it is often desirable to provide a suitable traction device which may be inserted through the tubular member and employed to draw the paper strip with the foamable material thereupon, into position within the member 20. Such traction means may conveniently comprise a wire 37, such as a spring steel wire, which is of considerable stiffness and springiness adapting it to be pushed through the tube. This wire may be wound upon a takeup-drum such as is indicated at 38 and which may be rotated by means of an appropriate crank handle such as is indicated at 39. The wire 37 may be gripped against the drum to prevent unwrapping, owing to the stiffness of the wire by means of presser roller 40 of soft rubber or other yieldable material. The traction wire is provided at its extremity with a suitable spring actuated clamping device indicated at 41 designed to grip the end of the paper strip. Before the latter is inserted in the clamping device, it is preferable that opposite sides of the strip be folded together so that the strip can be conveniently started within the tubular member.

At the phase or stage illustrated in Fig. 1 of the drawings, the strip is illustrated as being ready for its insertion in the tubular member. As shown in Fig. 3, the strip has been drawn by the wire 37 entirely through the tubular member. The drawing is conducted steadily and uniformly so that a uniform layer of liquid, foamable material is discharged into the trough formed by tape 23. The tape thus carries a uniform layer of foamable material into desired position in the latter. The ends of the strip may now be severed, as for example by means of shears or other cutting device (not shown). The tube may be closed or partially closed, e.g. by means of caps of rubber or other elastic material indicated at 42 in Fig. 5 of the drawings thus to prevent the liquid mixture from spilling out. The tube or the caps may be provided with small weep holes, such as are indicated at 43 in Fig. 4, through which air within the tube may escape and through which any excess of foamable material may be bled off.

The foamable mixture within the tubular member will often foam and cure without application of extraneous heat. However, if it is desired to speed up the reaction such heat may be applied. Any convenient device may be employed to effect heating, for example, the frame comprising the tubular member may be inserted into an oven where it is subjected to hot gases or to radiant heat. It is also quite practicable to heat the tube inductionally as for example by inserting it in, or juxtaposing it to electrical coils through which alternating current is passed in order to induce eddy currents within the walls of the tubular member. For purposes of illustration, however, the tube is shown as being provided with a pair of metal clamps attached near the ends thereof and indicated at 44. These clamps are provided with eelctrical conductors 46 which in turn are joined to a suitable source of electrical current (not shown). Current, preferably of low voltage, is thus passed through the walls of the tubular member to produce heat through resistance. When the heating operation has been conducted for a sufficient period of time, the clamps may be detached.

As a result of the temperatures to which the foamable mixture is exposed, chemical reaction occurs in the mixture to release carbon dioxide and concurrently to effect cross-linking between the molecules thus converting the mixture into a foamed and cured, resinous material which as indicated at R in Fig. 6 completely fills the tube. In event that the tape material in the bottom of the tube is of sufficient permeability, the foamable mixture will strike therethrough and attach itself quite firmly by adhesion to the lower wall of the tube. It will also rise to fill the tube and to adhere to the walls not covered by paper.

Figure 7:
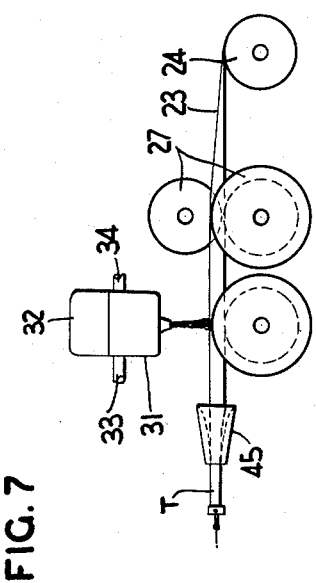
Fig. 7 illustrates the use of a funnel-like element with the apparatus of Fig. 1 designed to bend the strip into a tubular section.

The foamable mixture is shown as being carried into the member 20 in a tape bent to provide vertical sides. If preferred, it may also be formed into a tube T, for example, by drawing the channel-like strip through a folder which is indicated at 45 in Fig. 7 as being funnel-like. The groove in roller 28 and the outer perimeter of roller 27 should then be semi-circular in section. In event that the tape is to be formed into a tube, it may be coated with pressure sensitive gum, or the edges thereof may be coated with such gum, thus assuring that the edges of the strip will cohere and the tube will retain its form while being handled. The paper may also be rupturable, thus assuring that the tube will split under the pressure generated by the foaming action without subjecting the mixture to excessive pressure. If preferred, strong paper may be employed and rupture then attained by use of relatively weak pressure sensitive adhesive. A strong paper, scored to attain ease of rupture might also be employed.

In the embodiment of the invention as thus described, the foam is introduced into a tube of rectangular or other section such as might be employed as a longitudinal member of an automobile frame. However, this is but an illustration of the application of the principles of the invention. Similar techniques may also be employed in order to obtain adequate filling of various hollow bodies with foamed polyurethane resin. For example, in Fig. 8 of the drawings is illustrated, an element such as a panel 49 suitable for a door, or building wall and comprising an outer shell 50, such as might be formed of sheet metal such as sheet steel (with or without galvanizing) and which is of rectangular cross section. The top and bottom walls of this element are relatively close together and therefore, there is not adequate room to permit introduction by conventional methods of foamable mixture into the space between the walls in such position that it will foam and cure advantageously.

For purposes of introducing the mixture into the space, a sheet of flexible material 51 such as a piece of paper of the type already described is provided. In this instance, the sheet is of nearly the same width as the shell 50. This strip is shown as being disposed upon an endless conveyer belt 52 trained about pulleys 53 and 54 which may be driven by power means or which may be rotated by hand, as for example by means of a crank (not shown). The member 50 is disposed upon an appropriate support such as a table 56 in position to receive the sheet 51.

Foamable material may be spread upon the member 51 by appropriate means, as for example, by means of one or more spray nozzles indicated at 57 which may include separate jets for the isocyanate containing component and the water containing component of the reactive mixture. Such devices and appropriate foamable mixtures for use in combination therewith are illustrated in the copending application to Joseph J. Reis, Jr. Serial Number 522,928, filed July 9, 1955, already referred to.

In the operation of filling the shell 50 of the panel, a traction device such as a wire or a plurality of wires indicated at 58 is inserted through the shell and the end thereof is clamped as indicated at 59 to the end of the strip of sheet material. The spray 57 is then started in order to deposit a liquid layer of foamable material on the sheet while the conveyer belt 52 is caused to move in order to permit the sheet to be drawn into the shell. When the sheet bearing the liquid foamable material is in position the clamping device 59 may be released and removed, or the sheet may be severed in order to separate it from the clamping device. The foaming and curing of the mixture may be effected at room temperature, or, if preferred, to attain a greater speed of reaction, the assembly may be inserted into an oven where it is subjected to baking, as for example by means of convectional gases or by radiant heating. Obviously, other means of heating the shell may also be employed. If the tube being filled with foam has constricted, or expanded, portions, the amount of the layer foamable mixture deposited upon the tape may be increased or decreased at certain points along the length of the tape to provide for the increase or decrease of volume of foam required.

Emphasis has been placed upon introduction of the carrier of the foamable mixture into the tubular member to be filled while the latter is disposed horizontally. However, it is also permissible, in some instances, to dispose the member to be filled in vertical position. This is especially true if the carrier is of the tubular form illustrated in Fig. 7. The tube containing the foamable mixture may then be lowered into the cavity to be filled, using gravity to pull it down. In order to reduce the tendency of the foamable mixture to run, when the carrier tube is suspended, the tube may be constricted or closed at intervals, by such means as a band of tape or tie strings S (shown in Fig. 10). The carrier tube may be pulled through or dangled in tubes such as tubes 20 (in vertical position) or between the studdings of a building wall. When the mixture in the tube foams, it bursts the tube to fill the space.

In an extension of the principles of the invention, large or irregular chambers which are difficult to fill with foam by conventional methods may now be filled. In accordance with this technique, bags, boxes or tubes of paper or other easily rupturable material are filled, or partially filled with foamable material and these are then distributed at proper intervals and at proper points in the space to be filled. The mixture, when it foams, ruptures the container and then permeates through the contiguous space. If the containers are properly placed, the foam from one container will spread until it contacts the contiguous mass or masses, and the bodies cohere or at least press together substantially to fill the space.

The techniques of the present invention as previously described, may be employed with many different foamable mixtures comprising water, compounds containing isocyanate groups and compounds containing hydroxyls. Diisocyanates, such as tolylene diisocyanates, have been extensively employed as the isocyanate compound. Polyesters of dicarboxylic acids and amounts of alcohols in excess of stoichiometric value have enjoyed extensive use as the hydroxyl containing component. In the following examples, these components will be shown by way of illustration. Commonly, the diisocyanate and the polyester are emulsified with the water using a surfactant or emulsifier such as a conventional anionic, cationic or non-ionic emulsifier and being represented by fatty acid sulfonates of alkylated benzene or naphthalene and many others.

Catalysts such as tertiary amines are also commonly incorporated into the mixtures. Examples are N-methyl or N-ethyl morpholine, dimethyl ehanol amine and salts, such as the oxalic acid salts thereof.

Example I

The polyester component of the foamable resin comprises:

| | Moles |
|---|---|
| Phthalic anhydride | 1 |
| Adipic acid | 5 |
| Trimethylol propane | 9 |

This mixture is esterified in conventional manner to a hydroxyl number of 440±5 percent and to an acid value (maximum) of 1.5 and a water content of not more than 1/10 of 1 percent. The viscosity is approximately S at a solids content of 60 percent in Cellosolve.

The polyester component may be made into an emulsion (component A) comprising:

| | Parts by weight |
|---|---|
| Polyester (which is the same as the preceding) | 70 |
| Surfactant or emulsifying agent (polyethylene sorbitan monopalmitate sold as Tween-40) | 1 |
| Dimethyl ethanolamine (catalyst) | 0.25 |
| Water | 3 |
| Tricresyl phosphate (a fire retardant and stabilizer) | 10 |

This emulsion can be fed into one of the feed lines 33—34 of the mixer 31 while an appropriate amount of a diisocyanate, e.g. Mondur–TD is fed into the other. The mixture obtained may comprise 25 to 100 parts of diisocyanate per 100 parts of the polyester component. The mixture is fed from the nozzle 36 to the paper strip 23 or sheet 51, which is introduced into and foamed and cured respectively in the tube 20 or the shell 50.

If preferred, a part of the polyester may conveniently be made up as a prepolymer with excess isocyanate and in the absence of water into a liquid prepolymer containing available isocyanate groups and containing 1 equivalent of polyester with 6 equivalents of tolylene diisocyanate isomers. The prepolymer mixture contains approximately 80.5 percent of the tolylene diisocyanate isomer and 19.5 percent of the polyester. The mixed isomers comprise approximately 65 percent based upon the isomer mixture of 2,4-tolylene diisocyanates and 35 percent upon a like bases of 2,6-tolylene diisocyanate. The prepolymer is the isocyanate containing component B of the foamable mixture and is employed as a separate package.

The mixture comprising component A in an amount of about 100 parts by weight is incorporated with about 100 parts by weight of the prepolymer constituting component B. Preferably, the incorporation is effected at or just prior to the time the mixture is to be formed and foamed in its final state. The mixture may for example be formed by passing component A into the line 33 of the mixer 31 while the component B is introduced through the hose line 34. The mixture, as it is formed, is deposited upon the tape 23 which is then fed or drawn into tube 20. The mixture may be cured at 220 F. in 30 minutes. Cure may also be effected without extraneous heat.

It will be recognized that the tolylene diisocyanate may be prepolymerized in the substantial absence of water and with or without the addition of catalyst to provide a liquid prepolymer product, which when water is added, foams and cures to provide resinous bodies which can be filled into elongated tubes or chambers, foamed and cured by the techniques of this invention.

Example II

The polyester of this example comprises the following mixture of components:

| | Moles |
|---|---|
| Phthalic anhydride | 1 |
| Adipic acid | 5 |
| Glycerol | 8 |

This mixture is cooked to an acid number of about 10. The product has a high hydroxyl value and is susceptible of forming rigid, foamed resins when combined with tolylene diisocyanate. This polyester may be made up (in the absence of water) with diisocyanate to provide a prepolymer. The prepolymer with or without added polyester may be mixed with water and deposited upon a flexible sheet element for insertion into hollow bodies such as are disclosed herein.

Example III

In this example, the polyester is prepared comprising:

| | Moles |
|---|---|
| Phthalic anhydride | 1 |
| Adipic acid | 5 |
| Trimethylol propane | 9.2 |

This product is cooked to a hydroxyl value of about 473 and an acid value of approximately 1. The polyester is substituted for the polyester of Example I. The product is a rigid foam of light weight.

Example IV

The polyester component of this example is of the following composition:

| | Moles |
|---|---|
| Adipic acid | 5 |
| Phthalic anhydride | 1 |
| Diethylene glycol | 4 |
| Pentaerythritol | 3.6 |

The polyester may be substituted for the polyester component of Example I.

In many instances, it is desirable that there be a substantial interval between the steps of depositing the foamable mixture upon the carrier element, such as the tape 23, and the onset of vigorous foaming. This affords time for the charging of a sufficient length of tape and for inserting the same into an elongated chamber, or for other operations, before the foaming and setting reaction becomes excessively advanced. To this end, the foamable mixture may be catalyzed by means of a delayed action catalyst, such as a salt of a tertiary amine and a carboxylic acid. The salts of oxalic acid and dimethyl ethanolamine may be employed for the purpose. The preparation and use of such material is disclosed in a copending application Serial Number 563,845, filed by Samuel M. Terry, February 7, 1956, which is commonly owned with this application.

The preparation of the salt may be conducted as follows:

In order to prepare a catalyst solution suitable for catalyzing the reaction of the isocyanate and the polyester in forming polyurethane foams in accordance with the present invention, an aqueous mixture of oxalic acid and a tertiary amine may be formed. A typical mixture is of the following composition:

| | Parts by weight |
|---|---|
| Water | 40.0 |
| Oxalic acid | 30.0 |
| Dimethyl ethanolamine | 48.0 |

This is substituted in molecularly equivalent amount for the dimethyl ethanolamine in Example I of this application. The cure is conducted as in the latter example.

The forms of the invention as herein disclosed are to be considered as being by way of example. It will be apparent to those skilled in the art that numerous modi-

I claim:

1. A method of filling an elongated, hollow member with a foam of polyurethane resin, which comprises depositing a charge of a liquid foamable mixture of water, a compound containing a plurality of hydroxyls and a compound containing a plurality of isocyante groups upon and along the length of a strip of sheet material of a length substantially corresponding to that of the hollow member disposing the strip with the liquid foamable mixture thereupon longitudinally in the hollow member and foaming and curing the mixture; said carrier member being formed of sheet material transversely, concavely curved to hold the liquid mixture during insertion of the charged carrier member into the tubular member and being formed to allow the mixture to expand transversely of the tubular member during foaming, and thus to fill the member by transverse expansion.

2. A method of filling an elongated, hollow member with a foam of polyurethane resin, which comprises disposing the hollow member substantially in horizontal position, depositing a charge of a liquid, foamable mixture of water, an organic compound containing a plurality of hydroxyls, and an organic compound containing a plurality of isocyanate groups upon and along the length of a strip of sheet material of a length corresponding substantially to that of the hollow member and then disposing the strip containing the liquid, foamable material longitudinally along the lowermost portions of the hollow member and allowing the mixture to foam and cure whereby to expand transversely to fill the hollow member without substantial longitudinal expansion.

3. A method of filling an elongated, tubular member with a foam of polyurethane resin, which comprises depositing a charge of a liquid foamable mixture of water, an organic compound containing a plurality of hydroxyls and an organic compound containing a plurality is isocyanate groups upon and along the length of a strip of sheet material bent to a trough-like cross section and being of a length substantially corresponding to that of the tubular member, disposing the tubular member to be filled in substantially horizonal position, inserting the strip with liquid foamable mixture thereupon in the tubular member longitudinally thereof and foaming and curing the mixture, whereby the latter is caused to expand transversely of the tubular member to fill the same without substantial longitudinal expansion.

4. A method of filling an elongated, tubular member with a foam of polyurethane resin, which comprises disposing the tubular member upon its side and depositing a charge of a liquid foamable mixture of water, an organic compound containing a plurality of hydroxyls and an organic compound containing a plurality of isocyanate groups upon and along the length of a strip of sheet material, then bending the said strip to a hollow transverse cross-section, said strip being of a length substantially corresponding to that of the tubular member, inserting the strip with the liquid foamable mixture thereupon longitudinally in said tubular member and foaming and curing the mixture the strip being formed to provide an opening longitudinal thereof, allowing the foaming mixture to expand, whereby to fill the tubular member by transverse expansion of the foam without substantial longitudinal expansion.

References Cited in the file of this patent

UNITED STATES PATENTS

| | | |
|---|---|---|
| 2,395,293 | Pfleumer | Feb. 19, 1946 |
| 2,538,406 | Allen | Jan. 16, 1951 |
| 2,608,501 | Kimble | Aug. 26, 1952 |
| 2,700,183 | Beare | Jan. 25, 1955 |
| 2,728,702 | Simon et al. | Dec. 27, 1955 |
| 2,739,093 | Bull | Mar. 20, 1956 |

UNITED STATES PATENT OFFICE
CERTIFICATE OF CORRECTION

Patent No. 2,910,730                      November 3, 1959

Thomas A. Risch

It is hereby certified that error appears in the printed specification of the above numbered patent requiring correction and that the said Letters Patent should read as corrected below.

Column 5, line 10, for "eelctrical" read -- electrical --; column 7, line 6, for "ehanol" read -- ethanol --; column 9, line 8, for "isocyante" read -- isocyanate --; column 10, line 1, for "is" read -- of --; line 6, for "horizonal" read -- horizontal --.

Signed and sealed this 13th day of September 1960.

(SEAL)
Attest:

KARL H. AXLINE
Attesting Officer

ROBERT C. WATSON
Commissioner of Patents